United States Patent Office 3,717,699
Patented Feb. 20, 1973

3,717,699
TREATMENT OF GASES
Thomas Nicklin, Middleton, and Frederick Farrington, Stretford, England, assignors to The Gas Council, London, England
Filed May 21, 1970, Ser. No. 39,223
Claims priority, application Great Britain, May 22, 1969, 26,278/69
Int. Cl. C01b 17/16, 31/20
U.S. Cl. 423—222                14 Claims

ABSTRACT OF THE DISCLOSURE

Sulphur is produced from gaseous mixtures of hydrogen sulphide and sulphur dioxide by contact with a catalyst comprising an oxide of uranium, preferably admixed with a thorium oxide and preferably disposed on a carrier. If steam together with carbon oxysulphide and/or carbon disulphide are present, the carbon sulphides will react with steam in the presence of the catalyst to yield hydrogen sulphide. This latter reaction may take place simultaneously with the reaction of hydrogen sulphide and sulphur dioxide.

---

The invention relates to the treatment of gases and more particularly to the recovery of sulphur from gases containing hydrogen sulphide.

A conventional process for recovering sulphur from hydrogen sulphide-containing gases is to burn the hydrogen sulphide in the presence of a controlled amount of air in order to convert part of the gas to sulphur dioxide, and then to pass the resulting gaseous mixture through a reactor vessel containing a suitable catalyst on which occurs the reaction $$2H_2S + SO_2 \rightarrow 3S + 2H_2O$$

This process is known as the Claus Kiln process.

The temperature of the reactor is usually maintained at a temperature just high enough to prevent deposition of sulphur on the catalyst, and the treated gases are then cooled to condense the sulphur. If necessary several reactors in series are employed in order to reduce the amount of chemically combined sulphur present in the mixture. The catalysts employed are usually bauxite, other aluminas, or certain compounds of titanium, and are preferably shaped.

The process performs the dual function of recovery of sulphur and at least partial desulphurisation of effluent gases which latter may permit the gases resulting from the plant to be discharged into the atmosphere.

Where air pollution is a problem, however, for example where it is the subject of strict legislation, the effluent gases from the conventional Claus Kiln process may still be found to contain intolerable concentrations of sulphur dioxide or hydrogen sulphide. The presence of small amounts must in some cases be removed if the effluent gas is to be discharged into the atmosphere.

According to the present invention there is provided a process for the production of sulphur from a gaseous mixture containing hydrogen sulphide and sulphur dioxide, which process comprises contacting the gaseous mixture in a reactor vessel with a catalyst comprising one or more oxides of uranium, whereby hydrogen sulphide and sulphur dioxide are reacted together to yield sulphur.

Preferably the uranium oxide which may be, for example $U_3O_8$ or $UO_3$, is disposed on a catalyst carrier. Bauxite, corundum or active alumina is preferred as the carrier, but silica, kaolin, powdered brick, or an alkaline earth metal oxide or mixtures thereof may also be used.

It is preferred that the catalyst further comprises a thorium oxide, e.g. $ThO_2$. The proportion of uranium oxide present in the catalyst is preferably from 5 percent to 25 percent, more preferably 8 percent to 15 percent based on the weight of the metal in relation to the total weight of the catalyst. Thorium oxide is preferably present in an amount of from 3 percent to 15 percent, more preferably from 8 percent to 12 percent based on the weight of the metal in relation to the total weight of the catalyst.

Apart from being active in catalysing the reaction $$2H_2S + SO_2 \rightarrow 2H_2O + 3S$$

the catalysts used in the process of the present invention also act in the removal of carbon disulphide and carbon oxysulphide, two impurities which must in general be removed from gases before discharging into the atmosphere, and which may be present in a gas mixture containing hydrogen sulphide, which mixture is derived from, for example, a hydrocarbon feedstock, or a gas containing oxides of carbon.

Thus in a preferred aspect of the invention some or all of the hydrogen sulphide present in the gas is produced by the reaction of carbon disulphide and/or carbon oxysulphide with steam in the presence of the catalyst as described above for use in the process of the invention.

The reactions of steam with carbon disulphide and carbon oxysulphide are as follows:

$$CS_2 + 2H_2O \rightarrow CO_2 + 2H_2S$$

$$COS + H_2O \rightarrow CO_2 + H_2S$$

Conveniently, the removal of carbon oxysulphide and/or carbon disulphide by reaction with steam takes place in the same reactor as the reaction of hydrogen sulphide with sulphur dioxide. Alternatively the carbon oxysulphide and/or carbon disulphide are removed in the absence of sulphur dioxide. If the only reaction taking place in the reactor is the conversion of carbon oxysulfide and/or carbon disulphide to hydrogen sulphide and carbon dioxide, then the temperature of the reactor is preferably from 420° C. to 480° C.

The process of the invention may conveniently be incorporated in, or added onto, the conventional Claus Kiln process. Thus the gases containing hydrogen sulphide may be passed through a first stage consisting of a reactor vessel containing a suitable catalyst maintained at a temperature of not less than the dew point of the sulphur formed, and from which the gases pass to a sulphur condenser and coalescer, and thence to a second stage identical to the first. As the sulphur content of the gases is reduced, so the dew point is lowered and hence the temperature at which the reactor is maintained may be reduced. A low temperature is desirable in order to encourage the shift of the equilibrium to favour the formation of sulphur. One or more additional stages may be employed if necessary, the temperature being lowered each time.

At least one of the stages of the process described above includes a reactor in which hydrogen sulphide reacts with sulphur dioxide in the presence of a catalyst as herein described and comprising an oxide of uranium, preferably together with an oxide of thorium. In this reactor the carbon disulphide and carbon oxysulphide, if present, react with steam to form hydrogen sulphide and carbon dioxide.

It may be desirable to eliminate carbon disulphide and/or carbon oxysulphide at the earliest possible stage in a Claus Kiln process and for this purpose, the gases from the combustion stage may be brought into contact with a catalyst as herein described comprising uranium oxide preferably together with thorium oxide. Thus removal of carbon disulphide and/or carbon oxysulphide requires the presence of steam and it is expected that sufficient steam will be produced during the combustion stage. If hydrogen sulphide and sulphur dioxide are both present in the gas then this stage will constitute the first stage of a Claus Kiln process; if they are not both present, then the stage will form a preliminary stage to the Claus Kiln process. Development has taken place in recent years of processes for almost complete removal from gaseous mixtures, of hydrogen sulphide. These processes include passing the gases over zinc oxide and, more especially, the process known as the "Stretford Process," described in British patent specification No. 948,270, which involves washing the gas with a solution of sodium vanadate and the sodium salt of anthraquinone disulphonic acid. Such liquid purification processes will not readily tolerate the presence of sulphur dioxide, and it is therefore preferable, as far as possible, to remove substantially all of this gas from the gas mixture prior to such removal of remaining hydrogen sulphide. Thus it may be desirable to adjust the proportion of sulphur dioxide formed in the combustion step of a Claus Kiln process, so that after the reactions a slight excess of hydrogen sulphide, rather than sulphur dioxide, results. The excess hydrogen sulphide may then be removed by a further desulphiding stage. The last traces of sulphur dioxide may be removed, if desired, by washing the gas with sodium carbonate solution, or the like.

A specific embodiment of the process of the present invention will now be described with reference to the accompanying flow diagram.

A gas mixture comprising hydrogen sulphide is burnt at about 1000° C. and in a controlled amount of air to convert a proportion of the hydrogen sulphide present to sulphur dioxide. Some sulphur may also be produced, and the gas, after passing through a waste heat boiler is passed through a first sulphur condenser. The gas is then passed through a reactor vessel containing a Claus Kiln catalyst such as bauxite, at a temperature of 270° C., in which reactor the Claus Kiln reaction, $$2H_2S + SO_2 \rightarrow 2H_2O + 3S\downarrow$$

takes place.

The effluent gases are cooled in a sulphur condenser, a coalescer and the sulphur removed. The gases are then reheated and passed through a second Claus Kiln reactor at 190° C. containing bauxite as a catalyst, the gases leaving the reactor then passing through a sulphur condenser and to a sulphur catch vessel.

Thus far the process is a conventional Claus Kiln process. The gases coming out of the sulphur catch vessel however, are not allowed into the atmosphere, or recycled, but are passed through a heat exchanger and then through a reactor vessel at 350° C., the reactor vessel containing, as a catalyst, bauxite having on its surface uranium oxide and thorium oxide. In this reactor any carbon disulphide and carbon oxysulphide reacts with water vapour to form hydrogen sulphide and carbon dioxide in accordance with the reaction equations $$CS_2 + 2H_2O \rightarrow CO_2 + 2H_2S$$

$$COS + H_2O \rightarrow CO_2 + H_2S$$

The catalyst further encourages the Claus Kiln reaction referred to above, which reaction therefore removes the hydrogen sulphide formed in the decomposition of carbon disulphide and carbon oxysulphide.

The gas from the reactor contains a low proportion of sulphur dioxide, which is removed almost entirely by passing the gases through a further reactor containing active alumina, or a urania-thoria catalyst as hereinbefore described, and maintained at 180° C. to 250° C. The gas stream is then passed through a final sulphur condenser and coalescer before entering a plant for stripping off the remaining hydrogen sulphide.

EXAMPLE

This example demonstrates the effectiveness of a urania-thoria catalyst in the removal of sulphur dioxide and carbon disulphide in a mixture of gases containing, in addition, hydrogen sulphide.

A gas flow, having a composition typical of a gas effluent from the Claus Kiln process was heated in a leadbath preheated to a temperature of 140° C. and thence passed at space velocity of 16630 hour$^{-1}$, and at atmospheric pressure, into a stainless steel reactor containing a catalyst comprising a corundum carrier on which were disposed uranium oxide and thorium oxide in proportions of 8.9 percent uranium oxide, and 10.5 percent thorium oxide, expressed as the weight of the metals in relation to the total weight of the catalyst. During its passage through the reactor, the temperature rises to 350° C.

The change in composition of the gas flow was as follows:

|        | Gas flow in, ft.³/hour | Gas flow out, ft.³/hour |
|--------|------------------------|--------------------------|
| $N_2$  | 19.47                  | 19.47                    |
| $CO_2$ | 2.37                   | 2.53                     |
| $CS_2$ | 0.162                  | $<4.10^{-5}$             |
| $SO_2$ | 0.029                  | 0.004                    |
| $H_2S$ | 2.282                  | 0.556                    |
| $H_2O$ | 10.3                   | 10.03                    |

Some reaction between carbon disulphide and sulphur dioxide appears to have taken place after the reactor.

We claim:

1. A process for recovering elemental sulphur from a gaseous mixture containing both hydrogen sulphide and sulphur dioxide, said process comprising:

contacting a gaseous mixture containing both hydrogen sulphide and sulphur dioxide with a catalyst consisting essentially of an oxide of uranium in a proportion of from 5% to 25% expressed as the weight of the metal in relation to the total weight of the catalyst and a catalyst carrier selected from the group consisting of bauxite and α-alumina on which the uranium component is disposed, whereby hydrogen sulphide and sulphur dioxide in said gaseous mixture undergo reaction to produce elemental sulphur; and removing the elemental sulphur produced by said reaction from the reaction product.

2. A process as set forth in claim 1 wherein said oxide of uranium is present in a proportion of from 8% to 15% expressed as the weight of the metal in relation to the total weight of catalyst.

3. A process as set forth in claim 1 comprising passing said gaseous mixture successively through at least two catalytic reaction zones each of which zones contains a catalyst effective to catalyze the reaction of sulphur dioxide with hydrogen sulphide, one of said zones containing said uranium oxide catalyst, said zones each being maintained at a temperature sufficiently high to ensure that substantially no deposition of sulphur occurs therein, substantially all the sulphur present in the gas leaving any zone being removed before the gas passes into the next following zone.

4. A process for recovering elemental sulphur from a gaseous mixture containing both hydrogen sulphide and sulphur dioxide, said process comprising:

contacting a gaseous mixture containing both hydrogen sulphide and sulphur dioxide with a catalyst consisting essentially of an oxide of uranium in a proportion of from 5% to 25% expressed as the weight of the metal in relation to the total weight of the catalyst, an oxide of thorium in a proportion of from 3% to 15% expressed as the weight of the metal in relation to the total weight of the catalyst, and a catalyst carrier selected from the group consisting of bauxite and α-alumina on which the uranium and thorium components are disposed, whereby hydrogen sulphide and sulphur dioxide in said gaseous mixture undergo reaction to produce elemental sulphur;

and removing the elemental sulphur produced by said reaction from the reaction product.

5. A process as set forth in claim 4 wherein said oxide of thorium is present in a proportion of from 8% to 12% expressed as the weight of the metal in relation to the total weight of catalyst.

6. A process as set forth in claim 4 wherein said oxide of uranium is present in a proportion of from 8% to 15% expressed as the weight of the metal in relation to the total weight of catalyst.

7. A process as set forth in claim 5 wherein said oxide of uranium is present in a proportion of from 8% to 15% expressed as the weight of the metal in relation to the total weight of catalyst.

8. A process for recovering elemental sulphur from a gaseous mixture containing both sulphur dioxide and at least one of carbon disulphide and carbon oxysulphide, said process comprising:

contacting a gaseous mixture containing both sulphur dioxide and at least one of carbon disulphide and carbon oxysulphide, in the presence of steam, with a catalyst consisting essentially of an oxide of uranium in a proportion of from 5% to 25% expressed as the weight of the metal in relation to the total weight of the catalyst and a catalyst carrier selected from the group consisting of bauxite and $\alpha$-alumina on which the uranium component is disposed, whereby carbon disulphide and carbon oxysulphide in said mixture react with steam to produce hydrogen sulphide which in turn reacts with sulphur dioxide in said gaseous mixture to produce elemental sulphur;

and removing the elemental sulphur produced by said reaction from the reaction product.

9. A process as set forth in claim 8 wherein said oxide of uranium is present in a proportion of from 8% to 15% expressed as the weight of the metal in relation to the total weight of catalyst.

10. A process as set forth in claim 8 comprising passing said gaseous mixture successively through at least two catalytic reaction zones each of which zones contains a catalyst effective to catalyze the reaction of sulphur dioxide with hydrogen sulphide, one of said zones containing said uranium oxide catalyst, said zones each being maintained at a temperature sufficiently high to ensure that substantially no deposition of sulphur occurs therein, substantially all the sulphur present in the gas leaving any zone being removed before the gas passes into the next following zone.

11. A process for recovering elemental sulphur from a gaseous mixture containing both sulphur dioxide and at least one of carbon disulphide and carbon oxysulphide, said process comprising:

contacting a gaseous mixture containing both sulphur dioxide and at least one of carbon disulphide and carbon oxysulphide, in the presence of steam, with a catalyst consisting essentially of an oxide of uranium in a proportion of from 5% to 25% expressed as the weight of the metal in relation to the total weight of the catalyst, an oxide of thorium in a proportion of from 3% to 15% expressed as the weight of the metal in relation to the total weight of the catalyst, and a catalyst carrier selected from the group consisting of bauxite and $\alpha$-alumina on which the uranium and thorium components are disposed, whereby carbon disulphide and carbon oxysulphide in said mixture react with steam to produce hydrogen sulphide which in turn reacts with sulphur dioxide in said gaseous mixture to produce elemental sulphur;

and removing the elemental sulphur produced by said reaction from the reaction product.

12. A process as set forth in claim 11 wherein said oxide of thorium is present in a proportion of from 8% to 12% expressed as the weight of the metal in relation to the total weight of catalyst.

13. A process as set forth in claim 11 wherein said oxide of uranium is present in a proportion of from 8% to 15% expressed as the weight of the metal in relation to the total weight of catalyst.

14. A process as set forth in claim 12 wherein said oxide of uranium is present in a proportion of from 8% to 15% expressed as the weight of the metal in relation to the total weight of catalyst.

References Cited

UNITED STATES PATENTS

| | | | |
|---|---|---|---|
| 1,900,883 | 3/1933 | Lusby | 23—225 |
| 1,900,751 | 3/1933 | Baehr | 23—225 |
| 3,579,302 | 5/1971 | Sefton | 23—226 |

FOREIGN PATENTS

| | | | |
|---|---|---|---|
| 514,688 | 7/1955 | Canada | 23—225 |
| 223,904 | 5/1957 | Australia | 23—225 |

OSCAR R. VERTIZ, Primary Examiner

G. A. HELLER, Assistant Examiner

U.S. Cl. X.R.

252—467